April 30, 1957 F. G. BUHRENDORF 2,790,645

MAGNETIC RECORDING SYSTEM

Filed April 18, 1951 3 Sheets-Sheet 1

INVENTOR
F. G. BUHRENDORF
BY
V. P. Priolo
ATTORNEY

INVENTOR
F. G. BUHRENDORF
BY V. P. Triolo
ATTORNEY

April 30, 1957

F. G. BUHRENDORF 2,790,645

MAGNETIC RECORDING SYSTEM

Filed April 18, 1951

3 Sheets-Sheet 3

INVENTOR
BY F. G. BUHRENDORF
V. P. Priolo
ATTORNEY

United States Patent Office 2,790,645

Patented Apr. 30, 1957

2,790,645

MAGNETIC RECORDING SYSTEM

Frederick G. Buhrendorf, Westfield, N. J., assignor to Bell Telephone Laboratories, Incorporated, New York, N. Y., a corporation of New York Application April 18, 1951, Serial No. 221,658

4 Claims. (Cl. 274—20)

This invention relates to sound recording and reproducing systems, and particularly to a recording system wherein the record medium and the recording member are actuated by a common means.

One of the important steps in the completion of a toll call in a telephone central office is the transmission to the toll operator of the information provided by the calling subscriber and recorded by the A board operator, as for example, the number of the subscriber making the call and the number of the subscriber being called. It is, of course, desirable that the transmission of this information take place within as short an interval of time as is practicable. Magnetic recording systems may be used for this function and it is an object of this invention to provide a high quality, economical magnetic recording and reproducing system the record medium and magnetic heads of which cooperate in such manner as to provide a low entry time, that is, as short an interval of time as is practicable between the time it is decided to record or reproduce a signal and the time the actual recording or reproduction of said signal can begin.

In accordance with the general features of the invention, a cylindrical record medium and a plurality of magnetic head carriages movable relatively thereto are actuated by a common means, said record medium is adapted to revolve continuously while the motion of each of said carriages is selectively and independently controlled, and the recordings on said record medium are interlaced.

These and other features of the invention will be more clearly understood from the following detailed description and the accompanying drawings in which.

Figure 1:
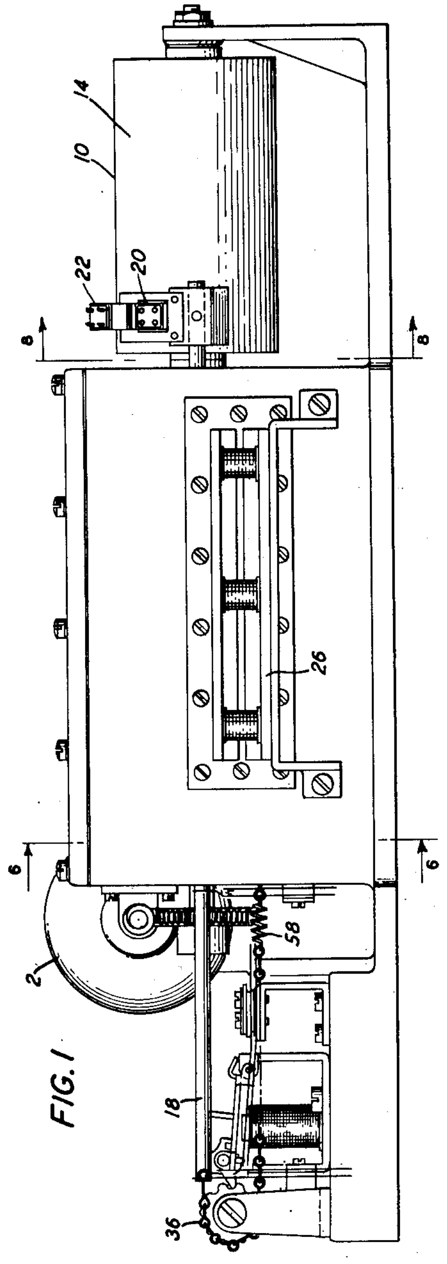
Fig. 1 is a side view of a recorder according to the invention.
Figure 8:
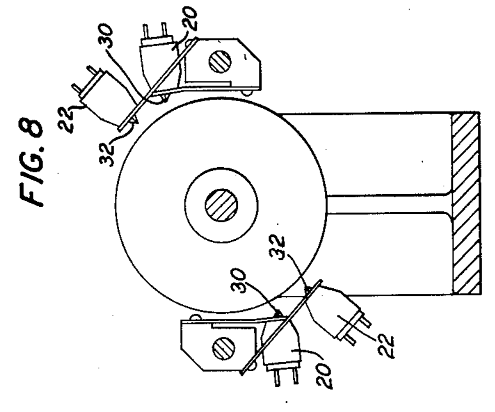
Fig. 8 is a sectional view along line 8—8 of Fig. 1.

Referring now to the accompanying drawings wherein like reference characters in the different figures designate similar elements, 2 is a motor which through a suitable worm 4 and worm wheel 6 drives two drums 8 and 10 mounted on a common shaft 12. The surface of drum 10 is provided with a magnetic record medium, 14. The magnetic record medium 14 may be in the form of a rubber belt or tire impregnated with magnetic iron oxide as disclosed in patent application Serial No. 120,396, filed October 8, 1949. Drum 8, which may be identified as the feed drum, has a buttress thread 16 cut on it.

A carriage 18, preferably in the form of a slide rod, has attached thereto an erasing head 20 and a record-reproduce head 22 and also a nut segment 24 to engage the buttress thread 16 on the revolving feed drum 8. Motion may be imparted to the carriage 18 by energizing the magnet 26. The magnet 26, when energized will attract the pivot arm 28 of nut segment 24 and thereby allow the nut segment to engage the buttress thread 16. Movement of the pivot arm 28, on being attracted by magnet 26, causes the carriage 18 to rotate since the nut segment 24 and the pivot arm 28 are fixedly attached thereto and the chain 36 permits freedom of movement. Rotation of the carriage not only allows the nut segment to engage the buttress thread, but also lowers the erase and record-reproduce heads on the record medium 14. The pole-pieces 30 and 32 of the erase and record-reproduce heads are prevented from striking the surface of the record medium 14 by virtue of the nut segment running down the sloping side of the buttress thread. Sufficient protection is provided by this action to prevent peening of the pole-pieces and injury of the record medium surface.

Figures 2, 3, 4:
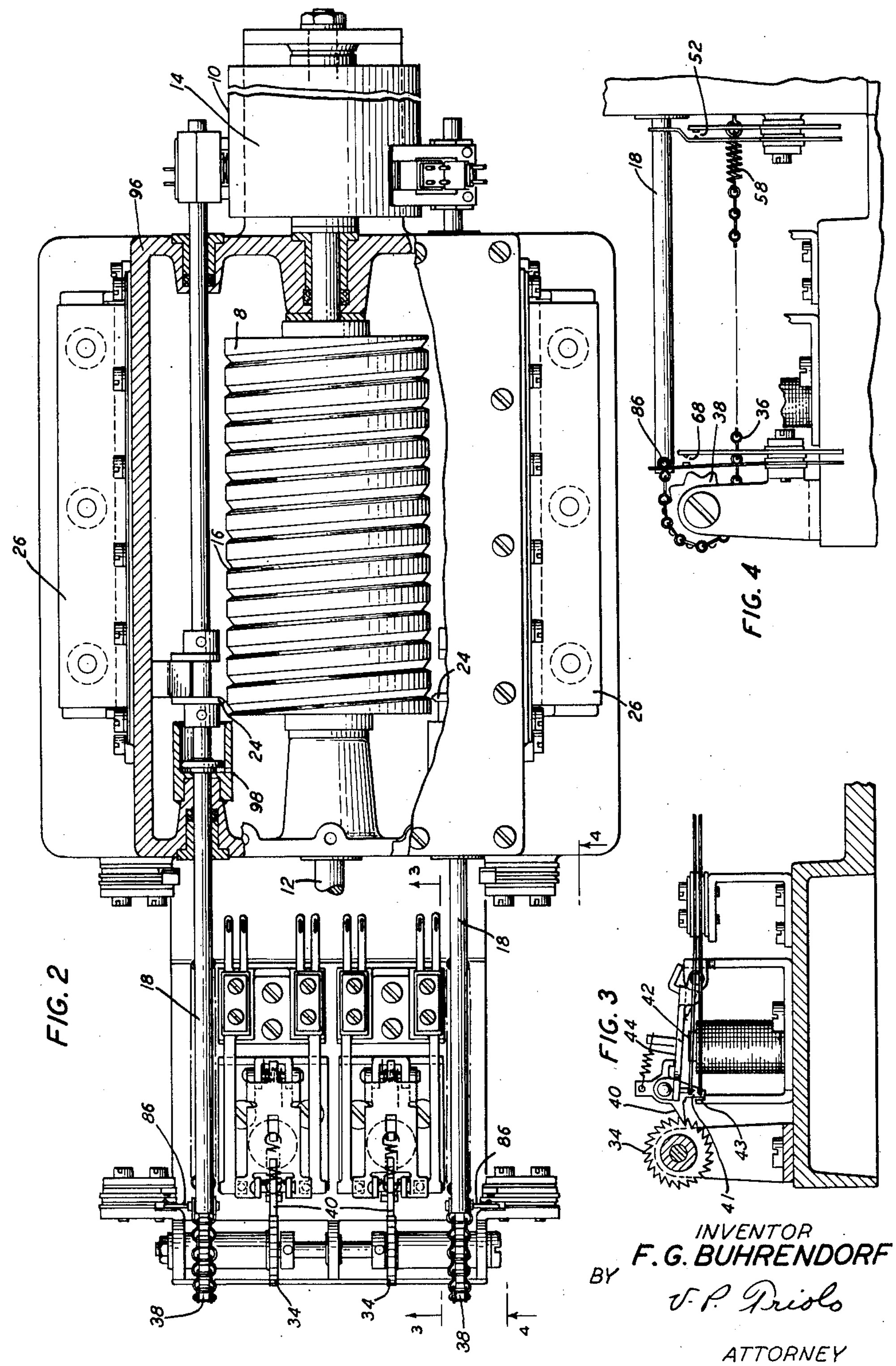
Fig. 2 is a plan view of the recorder shown in Fig. 1 with the drive shaft and the housing cover partly removed.
Fig. 3 is a sectional view along line 3—3 of Fig. 2.
Fig. 4 is a view along line 4—4 of Fig. 2.

In order to provide an indefinite stop period during the recording or reproducing cycle, the mechanism shown in detail in Figs. 3 and 4 is employed. When the carriage 18 is moved forward a ratchet wheel 34, rotated by means of the chain 36 and sprocket 38, engages a pawl 40, so that when the engaging magnet 26 is released and the nut segment 24 is disengaged from the thread 16 the carriage is prevented from returning to the starting position. After the stop period both the engaging magnet 26 and the holding magnet 42 are energized, the nut segment 24 is engaged by the buttress thread 16, and as soon as the carriage is moved far enough to raise the pawl 40 to the top of a tooth on the ratchet wheel 34, and the arm 41 clears the stop 43, the holding magnet is allowed to pull up its armature 44 and thereby disengage the pawl from the ratchet wheel. As will be explained in detail hereinafter, the pulling up of the armature 44 opens contact 46 and closes contact 48, which in turn releases the armature 44 and permits the pawl to engage the ratchet wheel so that if another stop should be made the carriage will be prevented from returning to the start position. At the end of the recording or reproducing cycle the closing of contact 50 or contact 52 energizes the relay winding 54 which in turn establishes a circuit which energizes the winding 56. The winding 56 energizes the magnet 42 which pulls up the armature 44 to hold the pawl 40 disengaged from the ratchet wheel 34 until the carriage 18 returns to the start position under action of the return spring 58.

Since recording or reproducing should take place only while the record-reproduce head is traveling across the record drum 10 the operator should be given notice of the moment at which motion is imparted to the carriage 18 and the heads 20 and 22. This notice may be initiated at the moment the armature 44 is pulled up to the magnet 42 by having the armature operate one or more contacts not shown in the drawings, to complete a suitable conventional signaling circuit.

Figure 9:
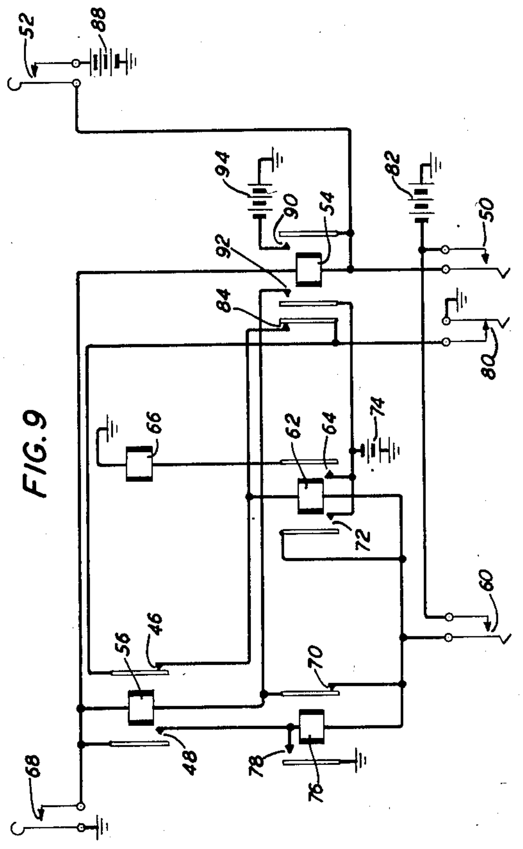
Fig. 9 is a schematic of the control system of the recorder shown in Figs. 1 and 2.

The motion of carriage 18 may be controlled in the following manner. With the feed drum 8 revolving continuously, the start contact 60, shown on the schematic in Fig. 9, is closed momentarily. This establishes a circuit from ground through battery 82, contact 60, the winding of relay 62, contact 84, contact 80, to ground. On operating, relay 62 locks by closing contact 72 and completing the circuit to ground through battery 74 rather than battery 82. The operation of relay 62 also closes contact 64 to complete the circuit from ground through the winding 66, the contact 64, battery 74 to ground thereby energizing the winding 66. Magnet 26 will thereupon attract the pivot arm 28. The carriage 18 will rotate and the nut segment 24 will come in contact with the feed drum 8. With the feed drum revolving continuously there is the probability that the nut segment will first rest on a "land" portion of the drum thread. Motion will not be imparted to the nut segment and the carriage until the nut segment falls into the thread.

As soon as motion is imparted to the carriage 18, the contact 68 will close and a circuit will be established from ground, through contact 68, the winding of relay 56, the contacts 70 and 72, battery 74, to ground. The winding of relay 56 energizes the magnet 42, which pulls up the armature 44 to open contact 46 and close contact 48. A circuit is then established from ground, through contact 68, contact 48, the winding of relay 76, contact 72, battery 74, to ground. On energizing the winding of relay 76, contact 78 is closed and relay 76 is locked by completing the circuit through a direct connection to ground. Contact 70 is opened, the winding of relay 56 is deenergized and the armature 44 is released.

To halt the motion of carriage 18 and provide an indefinite stop period during the recording or reproducing cycle, the contact 80 is opened momentarily. This breaks the ground connection for the circuit of locked relay 62. Relay 62 releases, opening contacts 64 and 72. As a result, the winding 66 is deenergized, the magnet 26 releases the pivot arm 28, and the nut segment 24 disengages the thread 16. The armature 44, having already been released, the pawl, 40 is engaged by the ratchet wheel 34 to prevent the carriage 18 from returning to the start position.

The carriage 18 may be "started" and "stopped" any number of times during the course of a complete cycle in the manner described by closing contact 60 or opening contact 80 momentarily.

At the end of the recording or reproducing cycle either contact 50 is closed momentarily, or, if the maximum available recording time has been used, contact 52 will be closed by the pin 86 attached to carriage 18. The closing of contact 50 will complete the circuit from ground through contact 68, the winding of relay 54, contact 50, battery 82, to ground. The closing of contact 52 will complete the circuit from ground, through contact 68, the winding of relay 54, contact 52, battery 88, to ground. By the completion of either of these circuits the winding of relay 54 will be energized and will cause contacts 90 and 92 to close and contact 84 to open. On closing contact 90, relay 54 will lock itself through battery 94, to ground. The closing of contact 92 establishes the circuit from ground, through contact 68, the winding 56, contact 92, battery 74, to ground. The winding 56 energizes the magnet 42, which pulls up the armature 44 to hold the pawl 40 disengaged from the ratchet wheel 34. The opening of contact 84 releases the relay 62. The opening of contact 72 releases the relay 76. The opening of contact 64 deenergizes the winding 66 and the magnet 26. The pivot arm 28 is released and the nut segment 24 is disengaged from the revolving feed drum 8. The carriage 18 returns to the start position under the action of the spring 58.

Figure 5:
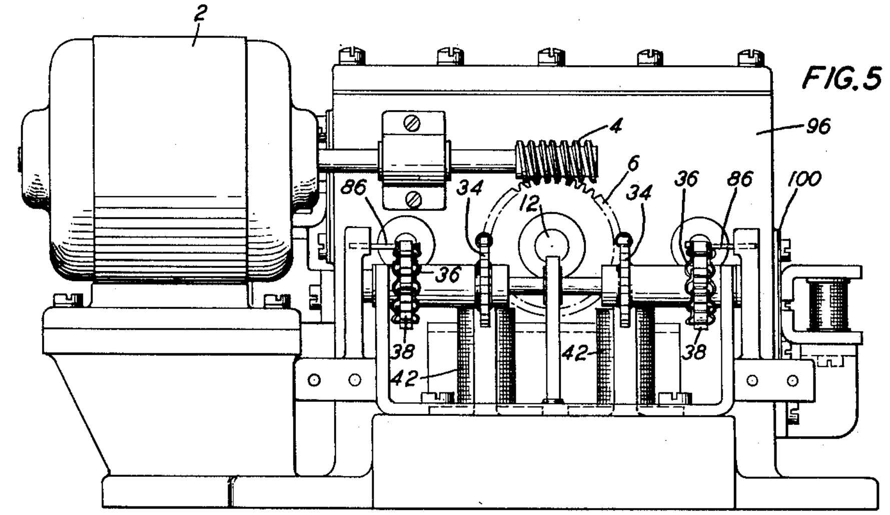
Fig. 5 is an end view of the recorder shown in Fig. 1.
Figure 6:
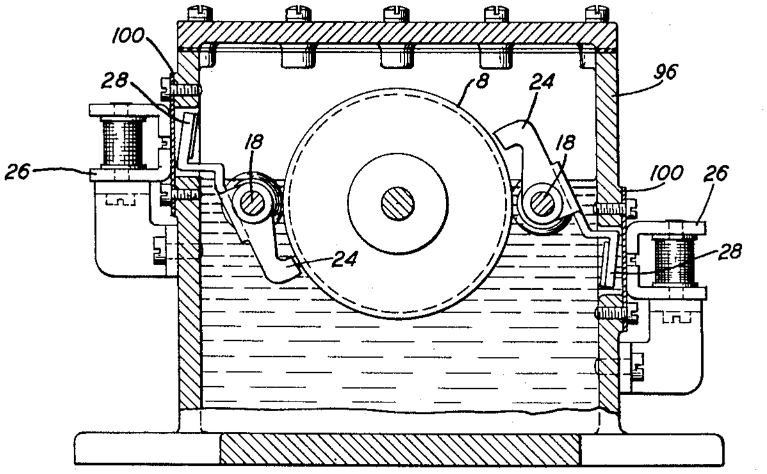
Fig. 6 is a sectional view along line 6—6 of Fig. 1.
Figure 7:
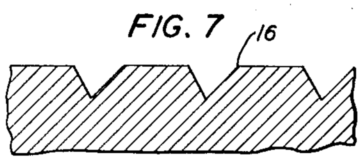
Fig. 7 is an enlarged sectional view of the buttress thread shown in Fig. 2.

Control of the speed at which carriage 18 returns to its start position and the elimination of excessive vibration which might cause injury to the components involved, as for example, the magnetic heads 20 and 22 have been realized by employing an oil-filled housing 96, within which the feed drum 8 is contained and through which the carriage 18 is actuated. The damping fluid in housing 96 is maintained at a level sufficient to fill the conventional dashpot 98. That portion of the housing which is in direct contact with the magnet 26 and the moving pivot arm 28 should preferably consist of a non-magnetic material possessing satisfactory wear-resisting properties. The diaphragm 100 used for this purpose, as shown in Figs. 5 and 6, may be made of Phosphor bronze.

It is to be understood that in the operation of the device described above a plurality of carriages may be actuated at the same time by the feed drum 8 and that the motion of each of these carriages may be selectively and independently controlled in the manner described, each carriage being provided with a separate control circuit of the type shown in Fig. 9.

The record-reproduce and erase heads associated with a particular carriage will always follow the same helical path on the record medium 14 and the helical paths formed by a plurality of record-reproduce heads will be interlaced.

The maximum entry time required for recording or reproducing along any one of these helical paths, after an indefinite stop interval, that is, an interval during which no motion is imparted to carriage 18, while drums 8 and 10 revolve continuously, is defined by the time interval within which the nut segment 24 will engage the thread 16 on the revolving drum 8. In accordance with this invention this time interval cannot be greater than the time required for one revolution of drum 8. Since each of the helical record paths may extend over many revolutions of drum 10, it may be readily appreciated that one revolution of drum 10 may represent a relatively short interval of the maximum available recording time.

The circuits associated with the erase and record-reproduce magnetic heads are conventional and have not, therefore, been described or shown.

It is to be understod that the above-described arrangements are illustrative of the application of the principles of the invention. Other arrangements may be devised by those skilled in the art without departing from the spirit and scope of the invention.

What is claimed is:

1. A sound recording system comprising a revoluble record member, a plurality of recording members movable relatively to said record member, a plurality of movable carriages for supporting said recording members individually, a feed screw common to all of said carriages for advancing said recording members relatively to said record member a predetermined maximum distance, said feed screw and record member being revoluble about the same axis, said feed screw comprising a buttress thread, each of said carriages comprising a rod member, a nut segment secured to each of said rod members, a recording member secured to each of said rod members, said recording member and nut segment on each carriage being spaced a fixed distance apart along said rod member, said fixed distance being different for each carriage and selected so as to provide interlaced recordings on said record member, means individual to each of said nut segments for independently and selectively actuating said nut segments to engage and disengage said feed screw and thereby move each of said recording members toward and away from said record member, the rate of fall of each of said recording members toward said record member after the related nut segment engages said thread being controlled by the rate of fall of said nut segment along the sloping flank of said thread, means individual to each of said rod members for preventing axial motion of said carriages in the backward direction, said means being operative when the nut segment related thereto is disengaged from said lead screw, said means being operative only until the recording member related thereto has been advanced said predetermined maximum distance.

2. A sound recording system comprising a revoluble record member, a plurality of recording members movable relatively to said record member, a plurality of carriages for supporting said recording members individually, a feed screw common to all of said carriages for advancing said recording members relatively to said record member a predetermined maximum distance, said feed screw and record member being revoluble about the same axis, said feed screw comprising a buttress thread, a housing, said feed screw being positioned within said housing, said carriages being adapted to travel through said housing, means common to said feed screw and said record member for actuating said feed screw and said record member simultaneously, each of said carriages comprising a rod member, a nut member secured to each of said rod members, a recording member secured to each of said rod members, said recording member and nut member on each carriage being spaced a fixed distance apart along said rod member, said fixed distance being different for each carriage and selected so as to provide interlaced recordings on said record member, means individual to each of said nut members for independently and selectively actuating said nut members to engage and disengage said feed screw and thereby move each of said recording members toward and away from said record member, the rate of fall of each of said recording members toward said record member after the related nut segment engages said thread being controlled by the rate of fall of said nut segment along the sloping flank of said thread, means controllable by the movement of each of said carriages after having advanced said maximum distance for individually actuating each of said nut members to disengage said feed screw, spring means affixed to said housing and to each of said carriages individually for returning each of said carriages to its initial position held prior to the start of its advance, damping fluid in said housing, and a damping mechanism affixed to each of said carriages cooperating with said fluid to control the speed at which each of said carriages returns to said initial position means individual to each of said rod members for preventing axial motion of said carraiges in the backward direction, said means being operative when the nut segment related thereto is disengaged from said lead screw, said means being operative only until the recording member related thereto has been advanced said predetermined maximum distance.

3. A sound recording system comprising a revoluble record member, a plurality of recording members movable relatively to said record member, a plurality of movable carriages for supporting said recording members individually, each of said carriages comprising a rod member, a feed screw common to all of said carriages for advancing each of said recording members relatively to said record member a predetermined maximum distance, said feed screw and record member being revoluble about the same axis, said feed screw comprising a buttress thread, a nut segment secured to each of said rod members, a recording member secured to each of said rod members, said recording member and nut segment on each carriage being spaced a fixed distance apart along said rod member, said fixed distance being different for each carriage and selected so as to provide interlaced recordings on said record member, means individual to each of said nut segments for independently and selectively actuating said nut segments to engage and disengage said feed screw and thereby move each of said recording members toward and away from said record member, the rate of fall of each of said recording members toward said record member after the related nut segment engages said thread being controlled by the rate of fall of said nut segment along the sloping flank of said thread, means controllable by the movement of each of said carriages after having advanced said predetermined distance for individually actuating each of said nut segments to disengage said feed screw, means for returning each of said carriages to its initial position after the recording member supported thereby has advanced said predetermined distance, means individual to each of said rod members for preventing axial motion of said carriages in the backward direction, said means being operative when the nut segment related thereto is disengaged from said lead screw, said means being operative only until the recording member related thereto has been advanced said predetermined maximum distance, means including said buttress thread and said means preventing axial motion of said carriages in the backward direction for individually causing said nut segments to reengage said feed screw at the point at which they were released therefrom.

4. A sound recording system comprising a revoluble record member, a recording member movable relatively thereto, a carriage for supporting said recording member including a nut segment, a feed screw for advancing said carriage and recording member relatively to said record member a predetermined maximum distance by means of said nut segment, said feed screw comprising a buttress thread, means for actuating said nut segment to engage and disengage said feed screw and thereby move said recording member toward and away from said record member, the rate of fall of said recording member toward said record member after said nut segment engages said thread being controlled by the rate of fall of said nut segment along the sloping flank of said thread, means associated with said carriage for preventing axial motion thereof in the backward direction, said means being operative when said nut segment is disengaged from said lead screw, said means being operative only until said recording member has been advanced said predetermined maximum distance.

References Cited in the file of this patent

UNITED STATES PATENTS

| | | |
|---|---|---|
| 858,184 | Holm | June 25, 1907 |
| 876,006 | Mills | Jan. 7, 1908 |
| 879,288 | Mayo et al. | Feb. 18, 1908 |
| 911,491 | Gilbert | Feb. 2, 1909 |
| 1,229,878 | Buchanan et al. | June 12, 1917 |
| 1,776,097 | Baird | Sept. 16, 1930 |
| 2,344,646 | Shrader | Mar. 21, 1944 |
| 2,380,754 | Hardy | July 31, 1945 |
| 2,617,705 | Coombs et al. | Nov. 11, 1952 |